United States Patent [19]

Johnson

[11] Patent Number: 5,110,573
[45] Date of Patent: May 5, 1992

[54] SILICA-ALUMINA-ORGANIC AMINE PRODUCT, ITS SYNTHESIS AND USE IN ZEOLITE PRODUCTION

[75] Inventor: Ivy D. Johnson, Medford, N.J.

[73] Assignee: Mobil Oil Corporation, Fairfax, Va.

[21] Appl. No.: 568,295

[22] Filed: Aug. 16, 1990

[51] Int. Cl.$^5$ .............................................. C01B 33/34
[52] U.S. Cl. ...................................... 423/328; 423/329
[58] Field of Search .................. 423/328, 329; 502/62, 502/77, 79

[56] References Cited

U.S. PATENT DOCUMENTS

| | | |
|---|---|---|
| 3,702,886 | 11/1972 | Argauer et al. ........................ 423/328 |
| 3,947,482 | 3/1976 | Albers et al. .......................... 423/328 |
| 3,972,983 | 8/1976 | Ciric ...................................... 423/328 |
| 4,530,824 | 7/1985 | Arika et al. ............................ 423/328 |
| 4,562,055 | 12/1985 | Arika et al. ............................ 423/328 |
| 4,650,654 | 3/1987 | Arika et al. ............................ 423/328 |
| 4,650,656 | 3/1987 | Dwyer et al. ......................... 423/328 |
| 4,847,055 | 7/1989 | Chu ....................................... 423/328 |

Primary Examiner—R. Bruce Breneman
Attorney, Agent, or Firm—Alexander J. McKillop; Charles J. Speciale; Marina V. Schneller

[57] ABSTRACT

The invention relates to the synthesis of a precursor containing silicon and aluminun and an organic directing agent for zeolite syntheses and its use in zeolite production.

14 Claims, No Drawings

SILICA-ALUMINA-ORGANIC AMINE PRODUCT, ITS SYNTHESIS AND USE IN ZEOLITE PRODUCTION

FIELD OF THE INVENTION

The invention relates to the production of a novel product which is useful as a reactant for zeolite synthesis. The product is a water-insoluble, particulate, organic amine bound amorphous silicate-aluminate. The particulate organic amine bound amorphous silicate-aluminate can be slurried in aqueous solutions and subjected directly to conditions effective to produce the desired zeolite.

BACKGROUND OF THE INVENTION

Naturally occurring and synthetic zeolites have been demonstrated to exhibit catalytic properties for various types of hydrocarbon conversions. Certain zeolites are ordered porous crystalline aluminosilicates having definite crystalline structure as determined by X-ray diffraction studies. Such zeolites have pores of uniform size which are uniquely determined by unit structure of the crystal. The zeolites are referred to as "molecular sieves" because the uniform pore size of a zeolite material may allow it to selectively absorb molecules of certain dimensions and shapes.

By way of background, one authority has described the zeolites structurally, as "framework" aluminosilicates which are based on an infinitely extending three-dimensional network of $AlO_4$ and $SiO_4$ tetrahedra linked to each other by sharing all of the oxygen atoms. Furthermore, the same authority indicates that zeolites may be represented by the empirical formula

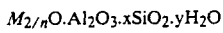

$$M_{2/n}O.Al_2O_3.xSiO_2.yH_2O$$

In the empirical formula, M was described therein to be sodium, potassium, magnesium, calcium, strontium and/or barium; x is equal to or greater than 2, since $AlO_4$ tetrahedra are joined only to $SiO_4$ tetrahedra, and n is the valence of the cation designated M; and the ratio of the total of silicon and aluminum atoms to oxygen atoms is 1:2. D. Breck, ZEOLITE MOLECULAR SIEVES, John Wiley & Sons, New York p. 5 (1974).

The prior art describes a variety of synthetic zeolites. These zeolites have come to be designated by letter or other convenient symbols illustrated by zeolite Z (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-11 (U.S. Pat. No. 3,709,979) and zeolite ZSM-23 (U.S. Pat. No. 3,076,842), merely to name a few.

ZSM-11 is described in U.S. Pat. No. 3,709,979. That description, and in particular the X-ray diffraction pattern of said ZSM-11, is incorporated herein by reference.

ZSM-12 is described in U.S. Pat. No. 3,832,449. That description, and in particular the X-ray diffraction pattern disclosed therein, is incorporated herein by reference.

ZSM-22 is described in U.S. patent application Ser. No. 373,451 filed Apr. 30, 1982, and now pending. The entire description thereof is incorporated herein by reference.

ZSM-20 is described in U.S. Pat. No. 3,972,983. The entire content thereof, particularly the specification of the X-ray diffraction pattern of the disclosed zeolite, is incorporated by reference herein.

ZSM-23 is described in U.S. Pat. No. 4,076,842. The entire content thereof, particularly the specification of the X-ray diffraction pattern of the disclosed zeolite, is incorporated herein by reference.

ZSM-35 is described in U.S. Pat. No. 4,016,245. The description of that zeolite, and particularly the X-ray diffraction pattern thereof, is incorporated herein by reference.

ZSM-38 is more particularly described in U.S. Pat. No. 4,046,859. The description of that zeolite, and particularly the specified X-ray diffraction pattern thereof, is incorporated herein by reference.

ZSM-48 is more particularly described in U.S. Pat. No. 4,375,573. Such a description includes the X-ray diffraction pattern for ZSM-48.

Zeolite beta is more particularly described in U.S. Pat. Nos. 3,308,069 and Re. 28,341.

Zeolite Y can be synthesized with an $SiO_2/Al_2O_3$ ratio up to about 5:1; in order to achieve higher ratios of $SiO_2/Al_2O_3$, various techniques have been developed to remove structural aluminum therefrom.

It is to be understood that by incorporating by reference the foregoing patents and patent applications to describe examples of specific members of the novel class with greater particularity, it is intended that identification of the therein disclosed crystalline zeolites be resolved on the basis of their respective X-ray diffraction patterns. As discussed above, the present invention contemplates utilization of such catalysts wherein the mole ratio of silica to alumina is essentially unbounded. The incorporation of the identified patents and patent applications should therefore not be construed as limiting the disclosed crystalline zeolites to those having the specific silica:alumina mole ratios discussed therein, it now being known that such zeolites may be substantially aluminum-free and yet, having the same crystal structure as the disclosed materials, may be useful or even preferred in some applications. It is the crystal structure, as identified by the X-ray diffraction "fingerprint", which establishes the identity of the specific crystalline zeolite material. The crystal structure of known zeolites may include gallium, boron, iron and chromium as framework elements, without changing its identification by the X-ray diffraction "fingerprint"; and these gallium, boron, iron and chromium containing silicates and aluminosilicates may be useful, or even preferred, in some applications described herein.

The silicon/aluminum atomic ratio of a given zeolite is often variable. For example, zeolite X can be synthesized with silicon/aluminum atomic ratios of from 1 to 1.5, while that ratio in zeolite Y is from 1.5 to 5. In some zeolites, the upper limit of the silicon/aluminum atomic ratio is unbounded. ZSM-5 is one such example wherein the silicon/aluminum atomic ratio is at least 2.5 and up to infinity. ZSM-5 is described in U.S. Pat. No. 3,702,886, together with its x-ray diffraction pattern which is relied upon and incorporated by reference herein. U.S. Pat. No. 3,941,871, reissued as U.S. Pat. No. Re. 29,948, discloses a porous crystalline silicate made from a reaction mixture containing no deliberately added aluminum and exhibiting the X-ray diffraction pattern characteristic of ZSM-5.

The exact chemical make-up of zeolites including ZSM-5 can determine the nature of its activity in a particular catalysis. Thus, the chemical make-up of the zeolite, in terms of its silica/alumina atomic ratio is of practical significance.

Silica precursors have been described for zeolite synthesis. For zeolite synthesis, the silica precursors are added to zeolite crystallization reaction mixtures and then admixed with organic or inorganic directing agents and then subjected to hydrothermal conditions effective for zeolite production specified by the directing agent.

SUMMARY OF THE INVENTION

The invention is directed to a new process of making zeolites. The new process of making zeolites can be a batch process or a continuous process. The new process allows for increased amounts of zeolite production.

In accordance with the invention, an essential component of the zeolite crystallization reaction mixture is a silica precipitate, the particle size of which is in the range of 1 to 500 microns.

The method of the invention comprises formation of amorphous silica sources under conditions to insure certain optimal particle size of the precipitated silica source and subsequent reaction of that silica source, in crystallization reaction mixtures of controlled composition, to form the zeolite. The method has the advantage that increased throughput and yield is realized. Moreover, control of reaction conditions can determine the crystal size of the zeolite which is produced.

A process of the invention comprises formation of amorphous silica sources under conditions to insure certain optimal particle size of the precipitated silica source and subsequent reaction of that silica source, in crystallization reaction mixtures of controlled composition, to form the zeolite. The product of the method has the advantage that its use in zeolite synthesis can result in increased throughput and zeolite yield. Moreover, control of reaction conditions can determine the crystal size of the zeolite which is produced.

The invention relates to organic compound derivatives silicate aluminates which are amorphous, discrete particles, as opposed to gels, and can be water washed and treated prior to use as starting reagents These products can be formed with various ratios of amine, silicon source(s) and/or aluminum source(s).

The organic silicate-aluminate of the invention differs from commercially available organosilicates which are provided as aqueous solutions. Those commercially available solutions, upon aging, form gels. Commercially available alkylammonium-silicates referred include methyl triethanol ammonium silicate and silicone dioxide, aqueous solution (Emery Chemicals); QURAM (Emery Chemicals), an alkylammonium silicate with a proprietary composition and tetramethylammonium silicate (SWAC).

The products of the invention are unique in that they are solids, not aqueous suspensions. As synthesized they contain solids contents of about 30 to 40 percent. Moreover, the products of the invention do not form a gel or change composition as a function of time, making them more stable than most other organo-silicates.

DETAILED DESCRIPTION OF THE INVENTION

The organic component containing amorphous silicate-aluminate product of the invention is a water-insoluble particulate product which is formed in a continuous process. The process comprises continuously reacting two feed streams in a reaction vessel, in the presence of an organic compound described below and sometimes referred to either as a directing agent or a template for zeolite synthesis. The contents of the reaction vessel are continuously stirred. The rates of addition of the feed streams are not per se critical but must be controlled, so that the product stream leaving the vessel has a pH which ranges from 6 to 10.

One of the feed streams contains a silicon source, used as a reactant for producing the amorphous product of the invention which is water soluble source of a silicate, preferably a sodium silicate. It can be provided as the commercially available Q-Brand.

The source of aluminum is preferably a soluble source of aluminum, such as aluminum sulfate. By soluble, as the term applies heretofor to the source of silicon and aluminum, water solubility is intended. In a preferred embodiment, these are provided as two different solutions, one being a solution of the soluble silicon source and the other being a water solution of the soluble aluminum source. The exact concentration of the source in the solution is dependent upon the final product desired. In embodiments of the invention the relative ratio of the source of silicate to the soluble aluminum source, for reaction, is at least about 50:1. In a preferred embodiment, an acid is added to the solutions; most preferably, the acid is added in the solution which contains the aluminum source.

The organic component which is present during reaction of the two feed streams can contain any element of Group VB such as nitrogen or phosphorus, preferably nitrogen. In addition to amines, preferred compounds are compounds generally expressed by the formula

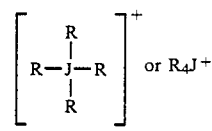

wherein J is an element of Group VB of the Periodic Table, e.g., N or P, preferably N, and each R is an alkyl or aryl group having between 1 and 18 carbon atoms, and preferably at least one R group is a methyl, ethyl, propyl or butyl group. The quaternary compound is generally supplied by introducing into the reaction mixture a composition such as the hydroxide, chloride or bromide of the tetraalkyl derivative of the desired VB element, e.g., tetraethylammonium hydroxide, tetrapropylammonium bromide, tetrapropylammonium hydroxide, tetrabutylphosphonium hydroxide, methyltriethylammonium chloride, and the like. Alkylammonium cation precursors generated in situ by reaction of tertiary amines with alkyl hydroxides or alkyl halide also may be used.

The organic compound, preferably an amine, is a directing agent for the desired zeolite which is to be produced. The organic amine is chosen with a view to subsequent zeolite synthesis. In a preferred embodiment the organic amine is in the ammonium form. It is known in the art that specific amines can act as organic "directing agents" or "templates" to produce selectively particular zeolites. Amines which have been used to produce selectively a given zeolite include primary, secondary, tertiary and quaternary amines. The organic moiety of the amine can be aryl, alkyl and substituted aryl and substituted alkyls. The alkyl can be from 1 to 20 carbon atoms, unsubstituted or substituted. In preferred embodiments here the amine is a tetraalkyl ammonium form.

In accordance with the invention, two reactant solutions are continuously fed to a reaction vessel. The contents of the reaction vessel are continuously stirred. The rates of addition of the two solutions are not per se critical but must be such that the streams removed from the reaction vessel have a pH ranging from 6 to approximately 10.

In the embodiments described below a heel is added to the reaction vessel. A heel is previously prepared amorphous silicate, amorphous aluminosilicate or the organic amine bound amorphous silicate-aluminate. The presence of the heel eliminates an initial gelation phase which must be discarded, therefore wasting reagents. The gel may also foul the stirrer used in the reaction vessel.

Continuous reaction of the two feed streams, in the presence of the organic compound (e.g., amine) results in the coprecipitation of a silica and aluminum source as an organic compound bound amorphous silicate-aluminate. That coprecipitation can be undertaken using a zeolite framework element other than aluminum, as a partial or complete substitute for the aluminum for zeolite synthesis. Accordingly, coprecipitation of the source of silicon can be in the presence of gallium, indium, boron, iron and/or chromium. The soluble source of these other zeolitic framework components can be e.g., nitrates. Such a coprecipitation product would be an amorphous, e.g., gallo-silicate, boro-silicate, ferrosilicate. Alternatively, soluble sources of gallium, indium, boron, iron and/or chromium can be added with the precipitated silica precursor to the zeolite crystallization stage.

Continuous precipitation of the amorphous silicate precursor, in accordance with the invention, comprises introducing the solution of silica source and the second stream to a reaction zone while maintaining a molar ratio of silica source to the reagent in the second stream substantially constant. In one embodiment, the two streams are introduced simultaneously into the reaction zone.

The continuous precipitation of silica source effects two results. Firstly, silica gel formation is at least substantially eliminated and secondly, the precipitated silica source particle size exceeds that silica particle size at which gel formation is possible. The precipitated silica precursor comprises agglomerated solids in the shape of microspheres. Suspensions of these particles exhibit low viscosities, with no gel formation at high solids loadings in subsequent processing, including zeolite synthesis, for example, even at solids loading equal to 15% or greater than 20-30% and even at 40% solids. This is in marked contrast to non-controlled neutralization which results in a solid, non-stirrable mass. In accordance, the particle size of the silica precipitate ranges between 1-500 microns but the average size is 50-100 microns Other conditions affecting precipitation include time, pH and temperature. The temperature of the precipitation mixture can range from ambient to 300° F. (up to 150° C.). The time of contact of the solution of silica source and the second solution stream can range from about 10 minutes to several hours at pH maintained from about 6 to 11. The product can be processed by isolating it, e.g., by filtration, and removing contaminants (soluble and water insoluble) therefrom, by washing and/or ion exchange. This stage can be considered a solids consolidation step.

Crystallization of the Silica Precursor

The aluminosilicate precursor can be crystallized to a crystalline microporous aluminosilicate, said crystalline silicate or said crystalline aluminosilicate having an X-ray diffraction pattern corresponding to a zeolite. Such known zeolites include small, medium, and large pore zeolites, some of which are identified above. Use of the silica precursor produced in accordance with the invention can be for the preparation of small, medium and large pore zeolites.

If the crystallographically crystalline material to be produced is to include in the framework alumina, in excess of that provided by the organic derivative of the silicate aluminate, gallium, indium, boron, iron, chromium or mixtures thereof, as for example in the ZSM-5 synthesis, that source can be employed after the silica precursor precipitation. The source of alumina can be any aluminum salt, for example, aluminum sulfate. The amount of the source of aluminum, etc., will depend on the desired ultimate aluminum content of the zeolite and on the zeolite production method. The silica precursor and alumina source can be admixed together in any order without adverse affects.

The zeolite is prepared from a crystallization reaction mixture containing the organic derivative of the silicate-aluminate, a source of OH$^-$ and water. The SiO$_2$/Al$_2$O$_3$ ratio in the crystallization reaction mixture, can vary depending on the specific zeolite sought to be produced. Make-up quantities of sources of silicon and/or aluminum can be added to the crystallization reaction mixture to satisfy the required reactant silica:alumina ratio for crystallization of a specified zeolite, which is not provided in the amine bound amorphous silicate-aluminate of the invention. In accordance with the invention herein, the crystallization reaction mixture will contain an organic compound (R$_4$J) [wherein J is an element of Group VB] preferably an amine (primary, secondary, tertiary or quaternary); these compounds are sometimes referred as "directing agents" or "templates". The presence of the organic rather than its absence, together with control of crystallization temperature can determine crystal size of the product; at lower crystallization temperatures, zeolites of small crystal size will be obtained when organics are used. Optionally, the crystallization reaction mixture will contain 0 to 10 weight percent seeds suitable for crystalline silicate production.

Crystallization can be carried out at a total useful range of temperatures of 80° C. to about 300° C. for about 2-3 hours to 150 days.

The reaction mixture can be prepared either batchwise or continuously. Crystal size and crystallization time of the crystalline material, will vary with the nature of the reaction mixture employed and the crystallization conditions. In all cases, synthesis of the desired crystals may be facilitated by the presence of at least 0.001 percent, preferably at least 0.10 percent and still more preferably at least 1.0 percent, seed crystals (based on solid weight) of e.g., a previously prepared crystalline product. The source of seeds may be slurry from the mother liquor of a previous crystallization, processed or unprocessed, recycled to the crystallizer vessel.

Ion exchange of the crystalline silicate materials can be conducted to effect ammonium exchange at acidic sites of said materials. This is generally accomplished by ammonium ion exchange. The source of the ammonium ion is not critical; thus the source can be ammonium hydroxide or an ammonium salt such as ammonium nitate, ammonium sulfate, ammonium chloride and mixtures thereof. These reagents are usually in aqueous solutions; by way of illustration, aqueous solutions of 1N $NH_4OH$, 1N $NH_4NO_3$, 1N $NH_4Cl$ and 1N $NH_4Cl/NH_4OH$ have been used to effect ammonium ion exchange on these, and similar materials. The pH of the reaction mixture is not critical but generally maintained at 7 to 12. Ammonium exchange may be conducted for a period of time ranging from about 0.5 to about 20 hours at a temperature ranging from ambient up to about 100° C. The ion exchange may be conducted in multiple stages. Calcination of the ammonium exchanged will produce the crystalline silicate or zeolite in its acid form. Calcination can be affected at temperatures up to about 600° C. Prior to ammonium ion exchange, the zeolite containing organic can optionally be subjected to nitrogen precalcination at, for example, about 550° C.

In the case of many catalysts, it is desired to incorporate the zeolite hereby prepared with another material resistant to the temperatures and other conditions employed in certain organic conversion processes. Such matrix materials include active and inactive materials and synthetic or naturally occurring zeolites as well as inorganic materials such as clays, silica and/or metal oxides, e.g., alumina. The latter may be either naturally occurring or in the form of gelatinous precipitates, sols or gels including mixtures of silica and metal oxides. Use of a material in conjunction with the zeolite, i.e., combined therewith, which is active, may enhance the conversion and/or selectivity of the catalyst in certain organic conversion processes. Inactive materials suitably serve as diluents to control the amount of conversion in a given process so that products can be obtained economically and orderly without employing other means for controlling the rate or reaction. Frequently, crystalline silicate materials have been incorporated into naturally occurring clays, e.g., bentonite and kaolin. These materials, i.e., clays, oxides, etc., function, in part, as binders for the catalyst. It is desirable to provide a catalyst having good physical strength, because in petroleum refinery processing, the catalyst is often subjected to conditions, which tend to break the catalyst down into powder-like materials which cause problems in processing.

Naturally occurring clays which can be composited with the hereby synthesized zeolite include the montmorillonite and kaolin families which include the sub bentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolite catalyst hereby synthesized can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used.

The relative proportions of finely divided zeolite and inorganic oxide gel matrix vary widely with the zeolite content ranging from about 0.1 to about 90 percent by weight, and more usually in the range of about 10 to about 70 percent by weight of the composite.

In general, organic compounds such as, for example, those selected from the group consisting of hydrocarbons, alcohols and ethers, are converted to conversion products such as, for example, aromatics and lower molecular weight hydrocarbons, over the catalytically active form of the composition of this invention by contact under organic compound conversion conditions including a temperature of from about 100° C. to about 800° C. a pressure of from about 0.1 atmosphere (bar) to about 200 atmospheres, a weight hourly space velocity of from about 0.08 $hr^{-1}$ to about 2000 $hr^{-1}$ and a hydrogen/feedstock organic compound mole ratio of from 0 (no added hydrogen) to about 100.

Such conversion processes include, as non-limiting examples, cracking hydrocarbons to lower molecular weight hydrocarbons with reaction conditions including a temperature of from about 300° C. to about 800° C., a pressure of from about 0.1 atmosphere (bar) to about 35 atmospheres and a weight hourly space velocity of from about 0.1 to about 100; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 50; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g., benzene, toluene and xylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g., methanol, or ethers, e.g., dimethylether, or mixtures thereof to hydrocarbons including aromatics with reaction conditions including a temperature of from about 275° C. to about 600° C., a pressure of from about 0.5 atmosphere to about 50 atmospheres and a liquid hourly space velocity of from about 0.5 to about 100; isomerizing xylene feedstock components to product enriched in p-xylene with reaction conditions including a temperature from about 230° C. to about 510° C., a pressure of from about 1 atmospheres to about 35 atmospheres, a weight hourly space velocity of from about 0.1 to about 200 and a hydrogen/hydrocarbon mole ratio of from about 0 to about 100; disproportionating toluene to product comprising benzene and xylenes with reaction conditions including a temperature of from about 200° C. to about 760° C., a pressure of from about atmospheric to about 60 atmospheres and a weight hourly space velocity of from about 0.08 to about 50; alkylating aromatic hydrocarbons, e.g., benzene and alkylbenzenes, in the presence of an alkylating agent, e.g., olefins, formaldehyde, alkyl halides and alcohols, with reaction conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

EXAMPLES

Example 1

Solution I consisted of as-received sodium silicate (Q-Brand, 29% $SiO_2$) diluted with tetraethylammonium hydroxide (TEOH) solution (40%) in a ratio of 1300 g TEOH solution/liter sodium silicate. Solution II was aluminum sulfate dissolved in $H_2SO_4$ (0.3M $Al_2(SO_4)_3$ in 24% $H_2SO_4$). A $SiO_2/Al_2O_3$/Boron containing precursor was used as a heel to avoid the formation of the gel, (500 mls.). The two solutions were pumped through mechanical pumps into the stirred reaction vessel at rates which mixed the solutions approximately Sol I/Sol II=3:1. The pump settings were adjusted slightly to obtain a slurry pH between 8 and 10, preferably, 8 and 9. After an initial resonance time of approximately 5 minutes, the product slurry was removed continuously. Part of the product was filtered and air-dried, and the remainder was washed with deionized water. The compositions of these materials and the mother liquor ar given in Table I. The optical photographs of the precursor showed uniform, discrete precursor particles approximately 50 microns in diameter which could be aggregates of smaller particles approximately 2 to 4 microns in size.

| Composition Wt % | Filtered Air Dried Product | Washed Filtered Air Dried Product | Heel |
|---|---|---|---|
| $SiO_2$ | 27.0 | 26.1 | — |
| $Al_2O_3$ | 0.8 | 0.87 | — |
| N | 1.65 | 1.56 | 1.60 |
| C | 11.7 | 5.48 | — |
| Na | 0.90 | 1.4 | 1.4 |
| Ash | 32.4 | 32.8 | |
| $SiO_2/Al_2O_3$ | 57 | 51 | . |
| $N/Al_2O_3$ | 15 | 13 | |
| C/N (Ideal = 8) | 8 | 4 | |

There appears to be some decomposition of the tetraethylammonium cation.

Example 2

The unwashed precursor described in Example 1 (200 g 35=fc) was slurried in water (200 g). To this slurry, 10 g ZSM-20 was added as seeds. This mixture was charged to a 600 ml. stirred autoclave and crystallized at 150° C. for 4 days while stirring at 250 rpms. The crystalline product is a mixture of ZSM-20 and faujasite.

There are various advantages to the process of the invention. The process allows simplifying the crystallization. Furthermore, it would decrease the number of additions to the crystallizer; in the foregoing examples the organic is added directly to the sodium silicate which is then precipitated with the aluminum. The organic and aluminum are intimately combined which can reduce, or eliminate, the need to add excess organic reagents.

As described in U.S. Pat. No. 3,972,983, incorporated by reference herein, ZSM-20 can be prepared by forming a solution containing sources of an alkali metal oxide, preferably sodium oxide, an oxide of tetraethylammonium, an oxide of aluminum, an oxide of silicon and water, and having a composition. in terms of mole ratios

| | Broad | Preferred |
|---|---|---|
| $\dfrac{M^+ - R^+}{M}$ | 5-10 | 6-7 |
| $H_2O/SiO_2$ | 10-20 | 12-14 |
| $H_2O/OH^-$ | 15-30 | 19-21 |
| $SiO_2/Al_2O_2$ | 30-32 | 30.5-31.5 | wherein R is a tetraethylammonium cation and M is an alkali metal cation, and maintaining the mixture until crystals of the zeolite are formed. Thereafter, the crystals are separated from the liquid an recovered. Typical reaction conditions consist of heating the foregoing reaction mixture to a temperature of from about 50° C. for a period of time of from about 1 week to about 7 weeks. A more preferred temperature range is from about 90° C. to about 120° C. with the amount of time at a temperature in such range being from about 2 weeks to about 1 month.

The digestion of the gel particles is carried out until crystals form. The solid product is separated from the reaction medium, as by colling the whole to room temperature, filtering and water washing.

The crystalline product is dried, e.g. at 230° F., for from about 8 to 24 hours. Of course, milder conditions ma be employed if desired, e.g. room temperature under vacuum.

Although the present invention has been described with respect to preferred embodiments, it is to be understood that modifications and variations may be resorted to, without departing from the spirit and scope of this invention, as those skilled in the art will readily understand. Such modifications and variations are considered to be within the purview and scope of the invention, as those skilled in the art will readily understand. Such modifications and variations are considered to be within the purview and scope of the appended claims.

What is claimed is:

1. A process for producing a zeolite in the presence of an organic compound which is selective to the production of said zeolite, under zeolite crystallization conditions, wherein the process comprises
   providing a particulate, amorphous silicate-aluminate derivative of said organic compound effective to cause the crystallization of said zeolite under the conditions [B] below:
   (A) wherein said silicate-aluminate derivative is formed by a method which comprises:
      forming at least two aqueous solution streams, the first of said two streams containing a soluble source of silicon and a second stream containing a soluble source of aluminum,
      contacting the two streams continuously, in the presence of said organic compound, at a pH of less than 7, to form a product stream which has a pH of greater than 7 which contains an insoluble precipitate,
      wherein conditions of said contacting include a temperature of ambient to 300° C.,
      whereby said insoluble precipitate is said silicate-aluminate derivative, and
      wherein said derivative is stable to water washing; and (B) introducing said particulate, amorphous silicate-aluminate derivative to water to provide a system containing greater than 8 weight percent solids loading, wherein solids loading percent is defined by the formula $$\frac{\text{weight of said silicate aluminate}}{\text{weight of water plus silicate-aluminate}} \times 100\%$$

subjecting said system to elevated temperatures of 80° C. to 300° C., at pressures effective to produce said zeolite.

2. The process of claim 1 wherein said compound is of the formula

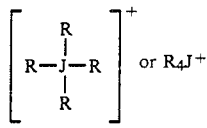

wherein J is an element of Group VB of the Periodic Table, selected from the group consisting of N or P, and each R contains form 1 to 18 carbon atoms and is selected from the group consisting of an alkyl, alkylene and aryl group.

3. The process of claim 1, wherein said system includes a silica:alumina ratio of at least 5:1.

4. The process of claim 1, wherein the zeolite is selected from the group consisting of ZSM-5, ZSM-11, ZSM-12, ZSM-20, ZSM-23, ZSM-35, ZSM-38, ZSM-48, and zeolite Beta.

5. The process of claim 1, wherein the derivative contains a quaternary ammonium compound.

6. The process of claim 5, wherein the zeolite is ZSM-20.

7. The process of claim 1, wherein said particulate, amorphous silicate-aluminate derivative has a particle size ranging from 1 to 500 microns.

8. A water-stable particulate material, having a particle size ranging from 1 to 500 microns, comprising the reaction product of a compound which is of the formula

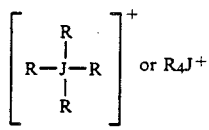

wherein J is an element of Group VB of the Periodic Table, selected from the group consisting of N or P, and each R contains from 1 to 18 carbon atoms and is selected from the groups consisting of an alkyl, alkylene and aryl group;

a water soluble source of aluminum; and
a water soluble source of silicon.

9. The material of claim 8, produced by forming at least two aqueous solution streams, the first of said two streams containing a soluble source of silicon and a second stream containing a soluble source of aluminum, contacting the said two streams continuously, in the presence of said organic compound, at a pH of less than 7, to form a product stream which has a pH of greater than 7 which contains an insoluble precipitate, wherein conditions of said contacting include a temperature of ambient to 300° C., whereby said insoluble precipitate is said material which is stable to water washing.

10. The process of claim 1 which further includes providing a heel which is an amorphous silicate material in amounts effective to avoid gelation during said contacting of said two streams; and contacting the said two streams continuously, in the presence of said organic compound and in the presence of said heel, at a pH of less than 7, to form a product stream which has a pH of greater than 7 which contains said insoluble precipitate which has a particle size of 1 to 500 microns, whereby gel formation is avoided in said (B).

11. A process for producing ZSM-20 zeolite in the presence of an organic compound which is selective to the production of said zeolite, under zeolite crystallization conditions, wherein the process comprises providing a particulate, amorphous silicate-aluminate derivative of said organic compound effective to cause the crystallization of said zeolite under the conditions of [B] below:

(A) wherein said silicate-aluminate derivative is formed by a method which comprises forming at least two aqueous solution streams, the first of said two streams containing a soluble source of silicon and a second stream containing a soluble source of aluminum, providing a heel which is an amorphous silicate material in amounts effective to avoid gelation during a contacting of said two streams;

contacting the said two streams continuously, in the presence of said organic compound and in the presence of said heel, at a pH of less than 7, to form a product stream which has a pH of greater than 7 which contains an insoluble precipitate, wherein conditions of said contacting include a temperature of ambient to 300° C., whereby said insoluble precipitate is said silicate-aluminate derivative, and wherein said derivative is stable to water washing; and (B) introducing said particulate, amorphous silicate-aluminate derivative to water to provide a system containing greater than 8 weight percent solids loading, wherein solids loading percent is defined by the formula $$\frac{\text{weight of said silicate aluminate}}{\text{weight of water plus silicate-aluminate}} \times 100\%$$

and subjecting said system to elevated temperatures of 80° C. to 300° C., at pressures effective to produce said zeolite.

12. The process of claim 11 wherein the organic compound is tetraethylammonium.

13. The process of claim 11, wherein the said insoluble precipitate has a particle size of 1 to 500 microns, whereby gel formation is avoided in said (B).

14. The process of claim 12, wherein the said insoluble precipitate has a particle size of 1 to 500 microns, whereby gel formation is avoided in said (B).

* * * * *